United States Patent
Urciuoli et al.

(10) Patent No.: US 8,296,059 B2
(45) Date of Patent: Oct. 23, 2012

(54) METHOD AND ARRANGEMENT FOR REDUCING CRIMINAL RISK TO AN OVERLAND TRANSPORT

(75) Inventors: Luca Urciuoli, Göteborg (SE); Jonas Tornberg, Göteborg (SE)

(73) Assignee: Volvo Technology Corp., Göteborg (SE)

( * ) Notice: Subject to any disclaimer, the term of this patent is extended or adjusted under 35 U.S.C. 154(b) by 496 days.

(21) Appl. No.: 12/304,307

(22) PCT Filed: Jun. 11, 2007

(86) PCT No.: PCT/SE2007/000566
§ 371 (c)(1), (2), (4) Date: Sep. 19, 2009

(87) PCT Pub. No.: WO2007/145565
PCT Pub. Date: Dec. 21, 2007

(65) Prior Publication Data
US 2010/0036610 A1    Feb. 11, 2010

Related U.S. Application Data

(60) Provisional application No. 60/804,442, filed on Jun. 11, 2006.

(51) Int. Cl.
*G01C 21/00* (2006.01)
(52) U.S. Cl. .................. 701/411; 701/400; 701/410
(58) Field of Classification Search .......... 701/200–202, 701/213, 400, 410–411
See application file for complete search history.

(56) References Cited

U.S. PATENT DOCUMENTS

| 6,175,803 | B1 | 1/2001 | Chowanic et al. |
| 6,415,226 | B1 * | 7/2002 | Kozak .......................... 701/210 |
| 2002/0120396 | A1 | 8/2002 | Boies et al. |
| 2005/0137793 | A1 | 6/2005 | Krull et al. |
| 2005/0197764 | A1 | 9/2005 | Wolf |
| 2006/0247852 | A1 * | 11/2006 | Kortge et al. .................. 701/209 |
| 2008/0208469 | A1 * | 8/2008 | Obradovich et al. .......... 701/213 |

FOREIGN PATENT DOCUMENTS

| EP | 0 978 706 A2 | 2/2000 |
| EP | 1 069 485 A2 | 1/2001 |
| EP | 1139317 A2 | 10/2001 |
| EP | 1 172 631 A1 | 1/2002 |

OTHER PUBLICATIONS

International Search Report for corresponding International Application PCT/SE2007/000566.

(Continued)

*Primary Examiner* — Hussein A. Elchanti
(74) *Attorney, Agent, or Firm* — WRB-IP LLP

(57) ABSTRACT

In navigation systems and methods thereof and, more particularly, navigation systems and methods for vehicles and, even more particularly, navigation systems and methods that reduce/minimize the incidence criminal activity during transport of cargo along a route a method is provided for determining a trip route for travel including the following steps: (i) obtaining start point data for a start point; (ii) obtaining end point data for an end point; (iii) obtaining crime risk data for at least one point along a possible trip route between said start point and said end point; (iv) determining a portion of a safe trip route between said start point and said endpoint based on said crime risk data; and, (v) communicating said portion of said safe trip route via a navigation device.

27 Claims, 5 Drawing Sheets

OTHER PUBLICATIONS

International Preliminary Report on Patentability for corresponding International Application PCT/SE2007/000566.
Supplementary European Search Report for corresponding European App. EP 07 74 8229.

Mar J et al.: "Simulations of the positioning accuracy of integrated vehicular navigation systems", IEE Proceedings: Radar, Sonar & Navigation, Institution of Electrical Engineers, GB, vol. 143, No. 2, Apr. 3, 1996, pp. 121-128, XP006006703, ISSN: 1350-2395, DOI: 18.1049/IP-RSN:19968222 *paragraph [84.5]; figure 4.

* cited by examiner

METHOD AND ARRANGEMENT FOR REDUCING CRIMINAL RISK TO AN OVERLAND TRANSPORT

BACKGROUND AND SUMMARY

The present invention relates generally to navigation systems and methods thereof, and more particularly, to navigation systems and methods for vehicles, and even more particularly, to navigation systems and methods that reduce/minimize the incidence criminal activity during transport of cargo along a route.

Electronic navigation systems and methods for directing vehicles along routes are fairly well known. For example, U.S. Pat. Pub. No. 2005/0227444, which is incorporated herein by reference in its entirety, describes a turn-by-turn navigation system including a positioning module for receiving positioning information and which is further capable of updating real time road information for purposes of providing turn-by-turn navigation information to a user. Somewhat similarly, U.S. Pat. Pub. No. 2005/0197764, which is also incorporated herein by reference in its entirety, describes a navigation system for a vehicle that provides updated route planning based upon current traffic volumes. Finally, U.S. Pat. Pub. No. 2005/0137793, which is also incorporated herein by reference in its entirety, describes a navigation system for a vehicle that is capable of providing detour route calculation capabilities.

Common to the aforementioned navigation systems is their ability to receive signals from radio network systems such as Global Positioning Satellite (GPS) systems to determine the location of the navigation device as well as their ability to calculate a route between a start point and an end point. Route calculation between a start point and an end point is typically accomplished by applying a known "A Star" (A*) type algorithm, or derivative thereof, that is capable of determining a route that is most likely to take the shortest amount of time or which is the shortest distance between the start point and end point. Of course, as described in the aforementioned publications, other considerations, such as current traffic conditions, e.g. congestion, can be used to calculate a route between points. Additionally, common to most such devices is that they include visual and/or audible means, such as visual displays and loudspeakers, for communicating navigation instructions to a user along a route. Finally, most such devices include receivers for receiving radio signals from satellites, computers for performing route calculations, and memory devices for storing geographical information.

An important application of navigation systems and devices is their use in cargo transport industry. Indeed, in the context of the transport of cargo over land, for example, by tractor-trailers, semi-trucks and the like, such systems and devices have proved indispensable for increasing efficiency, lowering fuel consumption and ultimately lowering costs. However, while such devices have proved successful, the cargo transport industry continues to suffer substantial economic losses as a result of criminal activity in the form of theft of vehicles, theft of cargo and injury to operators. Recent studies show that the primary cause of titiis phenomenon results from the continuous growth of the cargo transport industry along with trends such as globalization and outsourcing. On one hand, these trends increase the industry's cost-efficiency trade-offs, while on the other hand they expose the cargo, truck and driver to criminal threats, hi fact, supply chain and transportation planners must optimize flows of goods across greater distances, and there is often a lack of knowledge regarding the specific geographical areas to be traversed during transport. Such lack of knowledge can leave drivers, vehicles and cargo vulnerable to theft and other criminal activity. Even if high risk areas could be visible to planners, they typically lack sufficient knowledge with regard to which routes should be chosen to optimize trip efficiencies while simultaneously minimizing the risk of theft and/or assault.

Available solutions to problems related to theft and the like have typically centered upon the use of electronic sensors, such as alarms, face/iris/fingerprint scanners, and the like. These devices mainly serve to discourage thieves in the furthering a criminal act, once it has been initiated. For example, vehicle alarms tend to scare off thieves once the alarm has been activated, and vehicle disabling devices are activated once a vehicle has been stolen. Other, soft-solutions have also been adopted. For instance, GPS and fleet management systems have been implemented which are capable of tracking and tracing a vehicle and its cargo in an effort to decrease the time of recovery operations in case of theft or trailer intrusion. However, while such solutions have generally proved helpful to discourage the furtherance of criminal activity, once initiated, they have generally proved insufficient for preventing/minimizing the likelihood that criminal activity will be initiated in the first place. What is needed then is a navigation system and device that prevents and/or minimizes the initiation of a criminal act against a vehicle and/or user in possession of such device.

The present invention generally comprises systems and methods for searching and generating safe end-to-end (origin-to-destination) travel routes for vehicles, and especially for cargo transport vehicles such as long haul tractor-trailers and semi-trucks. A primary goal of the invention is to prevent and/or minimize vehicle and cargo theft, as well as to prevent and/or minimize injury to operators of vehicles by preventing/minimizing the likelihood that criminal activity will be initiated. It should be appreciated by those having skill in the art that while the invention is described relative to cargo vehicles configured travel over land, e.g., tractor-trailers and other wheeled cargo transport vehicles, the following description is not intended to be limited to such types of vehicles, vehicles configured for travel over land, cargo vehicles, or vehicles for that matter. For example, it is possible to configure a portable navigation device to aid users in determining an appropriate walking path.

In a method according to the invention, a route trip can be determined by obtaining start point data, end point data, and crime risk data for at least one point along a possible trip route between the start point and the end point. Using this information, a portion of a safe trip route between the start point and an end point based on the crime risk data can be determined, and in at least one embodiment a computer is implemented that is capable of conducting the determination through calculations. A portion of the safe trip route can then be communicated via a navigation device, hi an embodiment of the invention, the start point data, the end point data and the crime risk data are transmitted to a computer, which can be a component of the navigation device or a remotely located computer in communication with the navigation device. In some embodiments, the remotely located computer is capable of determining a portion of the safe trip route and transmitting data related thereto to the navigation device. Preferably, the navigation device includes visual and audible communications devices, such as electronic display screens and loudspeakers, hi some embodiments, crime risk data is stored in a remote computer database which is then communicated to the navigation device. In other embodiments, the crime risk data can be loaded into the memory of the navigation device. In some embodiments, crime risk data can be obtained by the navigation device, for example, from a police radio transmitter, and then transmitted from the navigation device to the computer for calculation of a safe route (the computer can be a component of the navigation device or can be a remotely located computer). In some embodiments, calculating a trip route further includes obtaining item data regarding at least one item to be transported and communicating the item data to the computer. The item data can include characteristics of the item, such as the monetary value of the item, the physical transport requirements (volume of an item, weight of an item, quantity of an item, dimensions of an item, time constraints for transport, fragility of an item, spoilage potential, etc), transport destination, etc. In some embodiments, the item data can be communicated to the computer by the item itself, such as by means of RFID tags, bar codes, etc. associated with the item, hi some embodiments, the entire safe trip route between the start point and the end point can be calculated by the computer, but only a portion thereof is subsequently communicated by the navigation device, for example, so as to prevent an operator from knowing and communicating the route that is to be traversed to a criminal actor.

In a preferred embodiment, a method for navigating along a trip route comprises obtaining start point data, end point data and crime risk data and communicating the data to a computer. A portion of a safe trip route between the start point and the endpoint is calculated upon consideration of the crime risk data and a sub-portion thereof is communicated to a user via a navigation device. The user then proceeds along the sub-portion of the safe trip route until a specified point is reached. Upon reaching the specified point, a further sub-portion of the safe trip route is communicated to a user via the navigation device. Further sub-portions of the safe trip route can be continuously provided until the destination is reached.

A navigation system for navigating a safe trip route according to the invention generally includes a navigation device and a computer. The navigation device is configured to indicate a geographical position of the navigation device, the computer is in communication with the navigation device and is capable of calculating a safe trip route upon consideration of at least a start point, an end point, and crime risk data for at least one point along a possible route between the start point and the endpoint. Additionally, the navigation device can be configured to calculate the safe trip route upon consideration of item data. The navigation device is capable of communicating at least a portion of the safe trip route as the navigation device traverses the safe trip route. In some embodiments, the system further calculates the safe trip route upon consideration of item data pertaining to at least one item to be transported and/or information regarding an operator of a vehicle. In some embodiments, the navigation device can include a transceiver for sending and receiving radio communications from at least one radio network (GPS ornon-GPS).

BRIEF DESCRIPTION OF THE DRAWINGS

Exemplary methods and arrangements conducted and configured according to the advantageous solutions presented herein are depicted in the accompanying drawings where in.

DETAILED DESCRIPTION

The invention will now be described and disclosed in further detail. It is to be understood, however, that the disclosed embodiments are merely exemplary of the invention and that the invention may be embodied in various and alternative forms. Therefore, specific structural and functional details disclosed herein are not to be interpreted as limiting the scope of the claims, but are merely provided as examples to teach one having ordinary skill in the art to make and use the invention.

Figure 1:
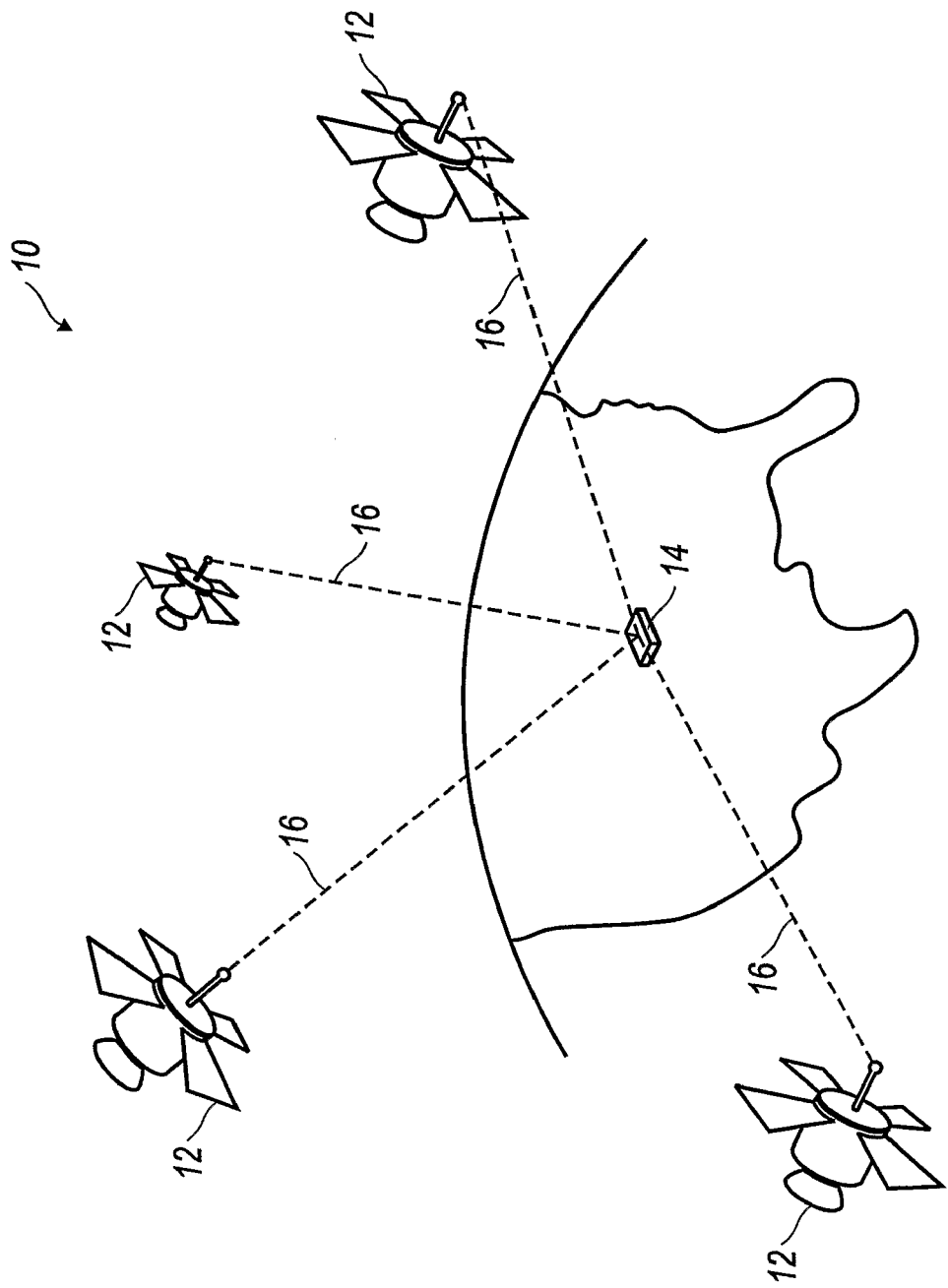
FIG. 1 is an illustration of a prior art GPS network configured for communication with a navigation device.
Figure 2:
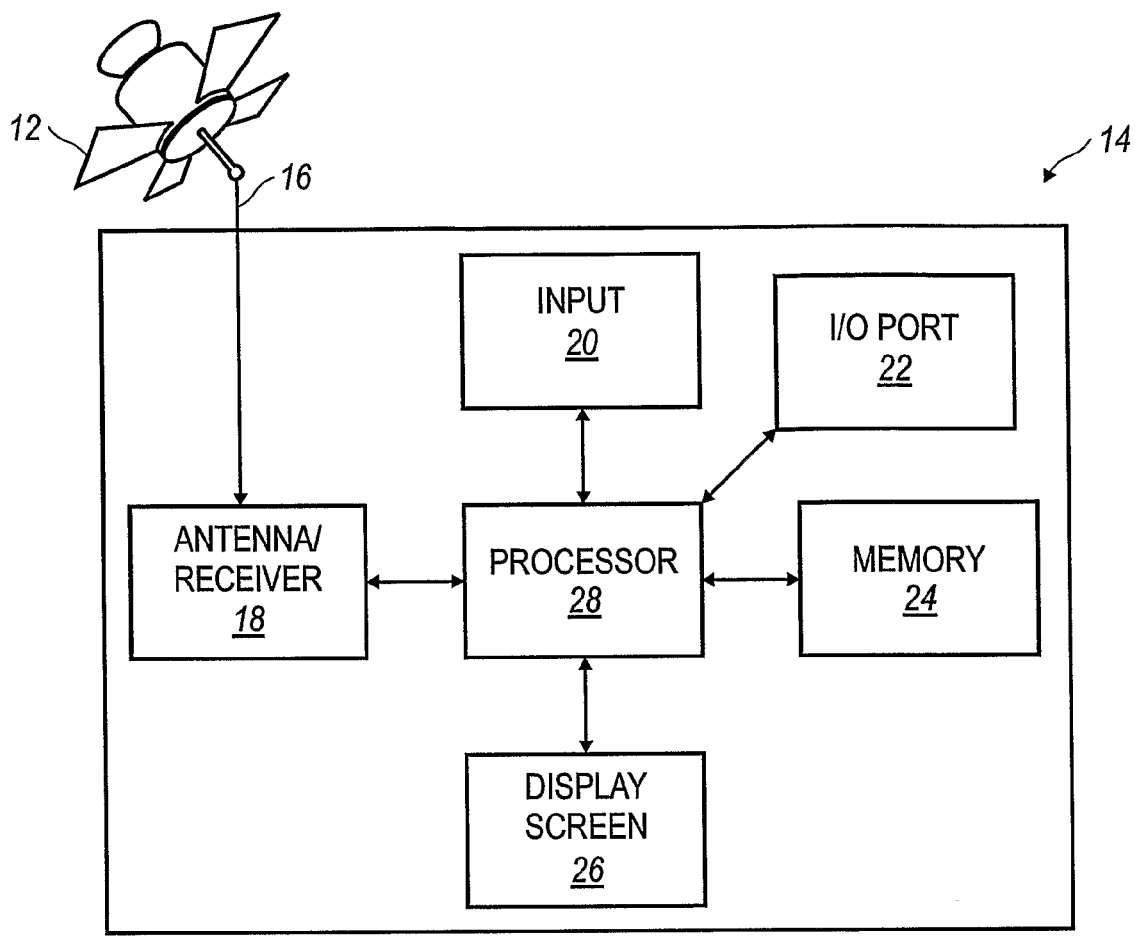
FIG. 2 is a schematic illustration of a prior art navigation device.

Referring now to FIGS. 1-2, a known GPS navigation system 10 comprises a plurality of satellites 12 in communication with a navigation device 14. As illustrated in FIG. 2, known navigation device 14 is capable of receiving signals 16 from satellites 12 in order to geographically locate the navigation device 14 relative to the earth. Navigation device 14 generally comprises an antenna 18, for receiving signals from a number of satellites, an input device 20, for inputting information into the navigation device 14, such as a destination, an input output/port 22, for loading/unloading, for example, software such as maps, a memory 24, for storing software/maps, a display screen 26 and a processor 28, for, for example, calculating a route based on the information input into the device by a user, such as a desired destination. Additionally, the navigation device can be comprise an input/output device such that the driver can input data into the navigation device. Furthermore, the navigation device can be equipped such that a communications port is provided to read data associated with the item data.

Most known devices, in calculating a route to be traversed based on a startpoint A and endpoint B, apply an A* (A Star)-type algorithm to determine the route which has the shortest distance between point A and B, or which is likely to take the least amount of time based on road type, average speed limit of roads, etc. Accordingly, as shown in the roadmap 30 of roads 32 in FIG. 3, when such devices are tasked with calculating a route between point A and B based on shortest distance or shortest time algorithms, the route most likely to be displayed is the route described by arrows 34.

Referring now to FIGS. 3-8, by contrast, the navigation system and methods 40 of the instant invention are configured to consider factors in addition to the shortest distance and/or shortest amount of time it may take to travel between points A and B. Indeed, the systems and methods of the instant invention are capable of considering factors such as the incidence of criminal activity along routes or within regions, the monetary value and/or nature of cargo being transported and/or operator of a vehicle, hi this manner, the risk that the vehicle, cargo and/or operator will be subject to criminal activity can be reduced in view of costs.

Figure 4:
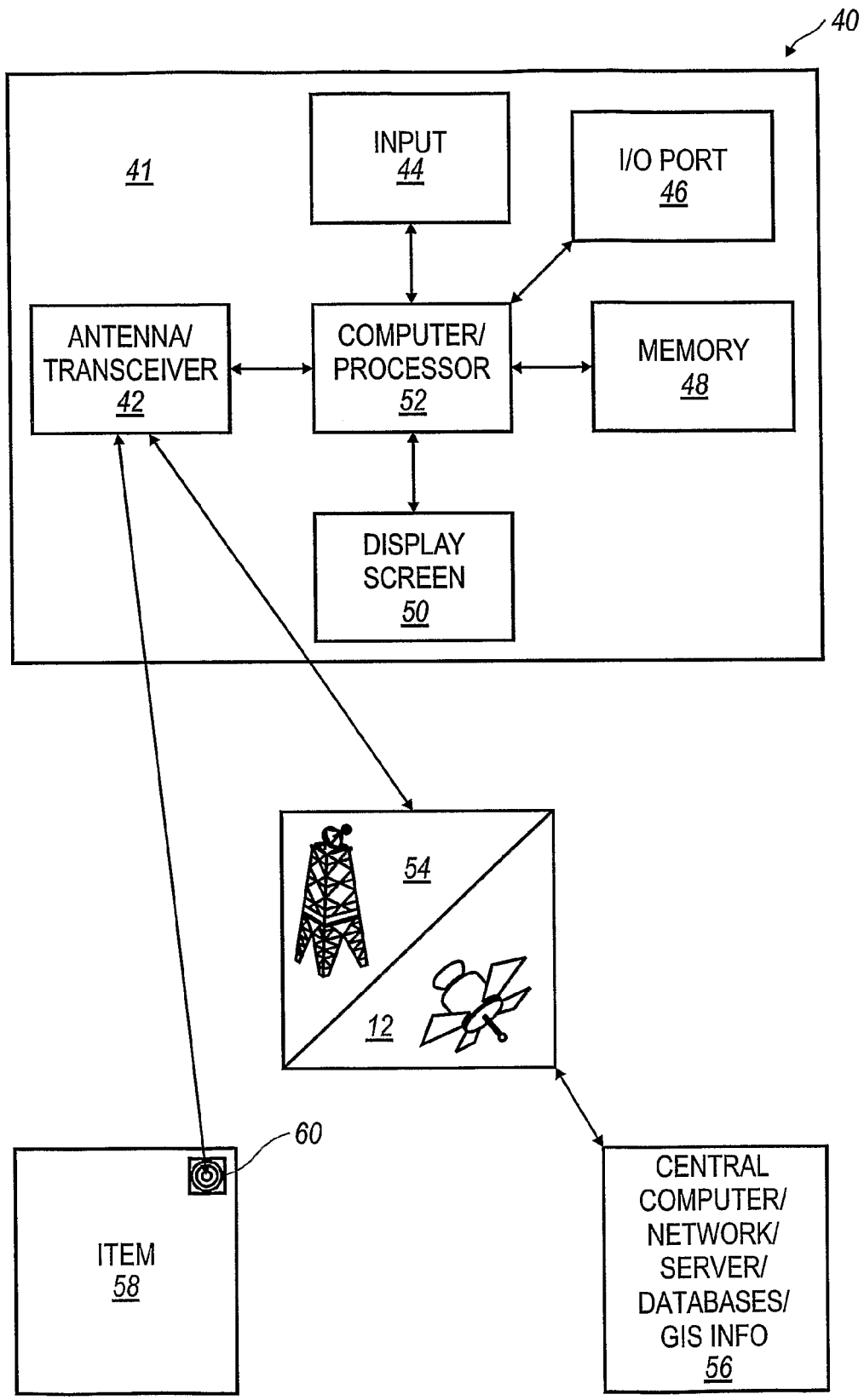
FIG. 4 is a schematic illustration of a navigation system and device according to the present invention.

As shown in FIG. 4, a navigation system 40 according to the invention can comprise a navigation device 41, which can include an antenna/transceiver 42, an input device 44, an input/output port 46, and memory 48, a visual or audible communications device, such as display screen 50, and a computer/processor 52. Navigation system 40 further includes a radio communications network, such as a network of satellites 12 and/or radio towers 54, which can also communicate with the navigation device 41 and/or a remote computer, network server, databases, etc. 56 (hereinafter referred to as "remote computer") of the navigation system. As shown in FIG. 40, an item/cargo to be transported 58 can comprise a communications device 60, such as an RFID tag, which can communicate with the navigation device 41 and remote computer 56.

Antenna/transceiver 42 is generally provided for sending and receiving signals to/from a radio communications network, such as a network of satellites 12 and/or radio towers 54. Antenna/transceiver 42 can also send and receive signals to/from item 58, which can include a communications device 60 such as an RFID tag, bar code, etc. Information regarding an item can be relayed from the navigation device 41 and to computer/processor 52 and/or remote computer 56 for processing. Antenna/transceiver 42 may also receive information from other sources, such as traffic networks, police networks, etc. and may forward such information to computer/processor 52 and/or remote computer 56. For example, while traveling along a route the navigation device 41 may receive communications regarding criminal activity/or traffic congestion in an area and forward the same to, depending upon the specific operational configuration, computer/processor 52 or remote computer 56 for modification of a route to be traversed.

Input 44 is generally provided for inputting information, such as route origin and destination information, information pertaining to cargo, and/or a particular operator of a vehicle, etc. Input of information can be performed locally, e.g., manually by activating buttons, knobs, or voice activation, etc., or remotely via remote computer 56 and/or antenna 42 receiving signals from an item 58 or other device. I/O port 46 is generally provided for loading/unloading software applications such as maps and/or route determination algorithms. Memory 48 is provided for storing information such as maps, database information (such as various modules discussed infra), algorithms or other information, such as places of interest, etc. Memory may also be provided on remote computer 56. Display screen 50 is provided for visually displaying maps, a route to be traversed and other information. Audible means for communicating information to a user, such as loudspeakers, can also be provided. Computer/processor 52 is provided for running the various operations of the navigation device, for example, communication between the device and a network, displaying maps, running software, displaying route information and the like. Navigation device 41 can be configured such that route determination is performed locally on the device itself via computer/processor 52 or remotely via remote computer 56.

Figure 5:
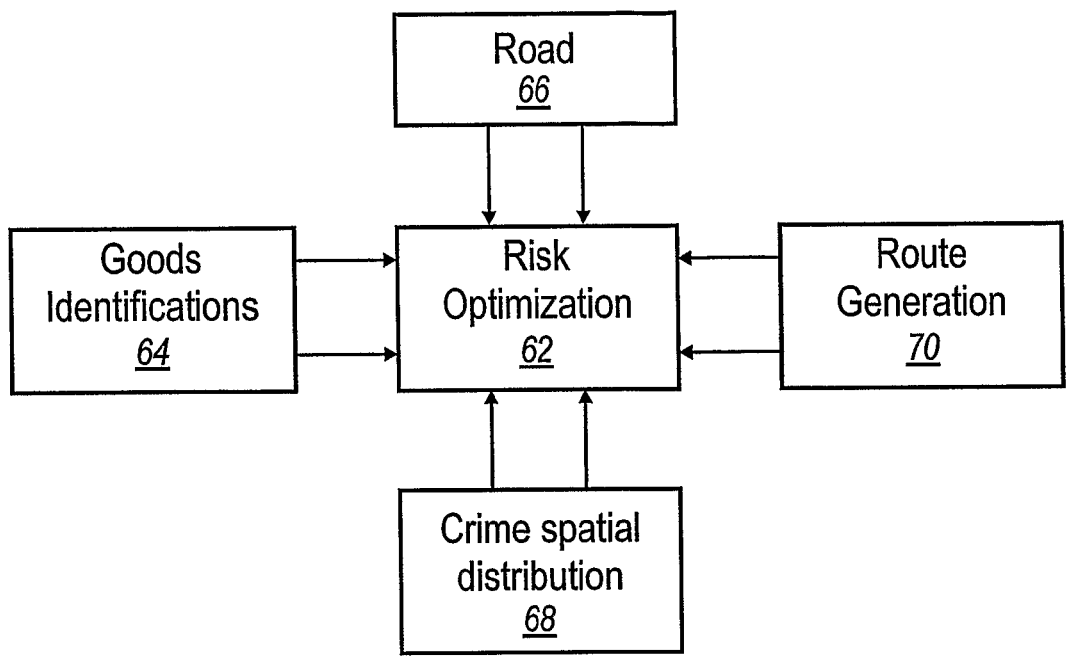
FIG. 5 is a schematic illustration of an algorithm/module for determining a trip route according to the present invention which includes consideration of crime risk data.

Referring now to FIGS. 5-8, a method according to the invention is illustrated in FIG. 5 and is shown as being accomplished by virtue of risk optimization algorithm 62, which utilizes inputs from a number of sources, for example, identification of goods module 64, road network data module 66 and crime distribution module 68, which is a spatial distribution of crime within an area of interest for generating route 70.

Risk optimization module 62 generally comprises a risk function that can compute and assign to a road network a risk index based on a theft/crime liability index and crime spatial distribution. For purposes of this writing, "risk index" is generally considered to be a function of frequency and consequence. Accordingly, assuming a road segment i of length $X$,- and the value of goods $C_{gv}$, risk can be computed by Generally, a risk index is assigned to each road segment of a road network and risk optimization is performed using existing theories and algorithms. The method ranks each road segment (edge of the network graph) in a road network database with a theft/crime risk factor, which is then balanced with an efficiency index. This value is then used as a cost value for a path minimum risk computation. In this manner, users can plan routes that attempt to avoid areas prone to theft/crime risk while maintaining route efficiency.

Likewise, the route can be optimized using similar techniques to the crime risk factor. For example, during some road segments a stop may be required for things such as rest stops, fuel stops, weigh stations, or other mandatory stops according to local law in addition to the deliver points. These factors can be considered as part of a particular road segment to further enhance the selection of the most efficient route. In some of these situations, such as rest stops, the vehicle will remain stationary and possibly increase the risk to vehicle, cargo, and operator to crime. These stops can further be considered in the ranking of the road segment based on the theft/crime risk factor.

Goods identification module 64 is provided for correlating goods to be transported with theft/crime statistics. Generally goods identification module 64 presents information regarding those goods most likely to be subject to criminal activity by percentage and by locale. A theft/crime liability index can be derived and used for the risk optimization.

Figure 6:
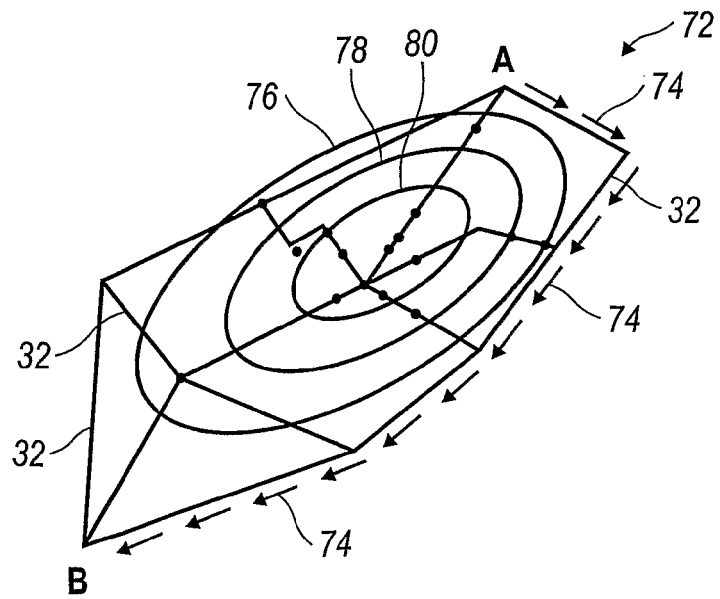
FIG. 6 is a schematic illustration of a road map depicting a trip route determined using a navigation system and method according to the present invention.

Road network module 66 generally comprises a graphical representation of a road network and comprising vertices and nodes linked with each other by means of edges (roads) as depicted in FIG. 6. In accordance with known heuristic methods, each edge can be characterized by a cost value.

Crime spatial distribution module 68 comprises geographically coded crime statistics and is used for purposes of considering crime levels and frequency. The crime spatial distribution module can be derived from existing data regarding crime within a region, and can be based on a number of factors, including but not limited to, specific locale, type of crime, time of day, etc. In this regard, studies have shown the existence of relationships between crime rates and locales wherein criminal acts are perpetrated. Accordingly, geographical information systems (GIS) can be used to monitor criminal activity data and describe its geographical distribution for spatial distribution analysis. Spatial distribution analysis can be based on known "clustering algorithms." A method according to the instant invention can use stored information regarding single crime events coupled with spatial coordinates to associate the crime data with the spatial coordinates. Accordingly, it is possible to compute and identify areas where crime is likely to occur and to identify which road segments of a road network pass therethrough and/or are likely to be subject to criminal activity.

Figure 3:
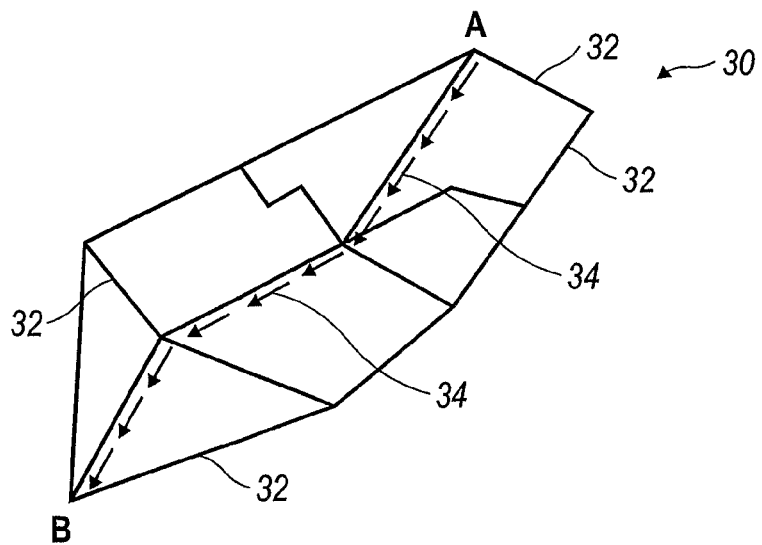
FIG. 3 is a schematic illustration of a road map depicting a route that has been determined using a prior art navigation device.

As shown in FIG. 6, upon application of the above modules and considerations, a minimum risk route 74 between points A and B of map 72 can be generated and communicated to an operator of the navigation device. The generated route can comprise a collection of geometric shapes (points and lines) which serve as representations of a road network. As shown by map 72, while route 74 may be a greater distance than route 34 of FIG. 3, areas of increased criminal activity 76, 78 and 80 and specific points of criminal activity 80 can be avoided.

In order to further aid in selecting the most efficient route, a randomized variation can be introduced to a selected route. In this situation, once a particular route is selected a randomized variation in a particular road segment can be implemented and optimization performed based upon this variation. By introducing a random variation to the path, the additional computation can further evaluate the previous optimized route to determine if a better solution exists. This random variation can be performed one or more times. The additional random variation can be terminated based upon number of iterations or another predetermined criteria such as change in optimization criteria.

Figure 7:
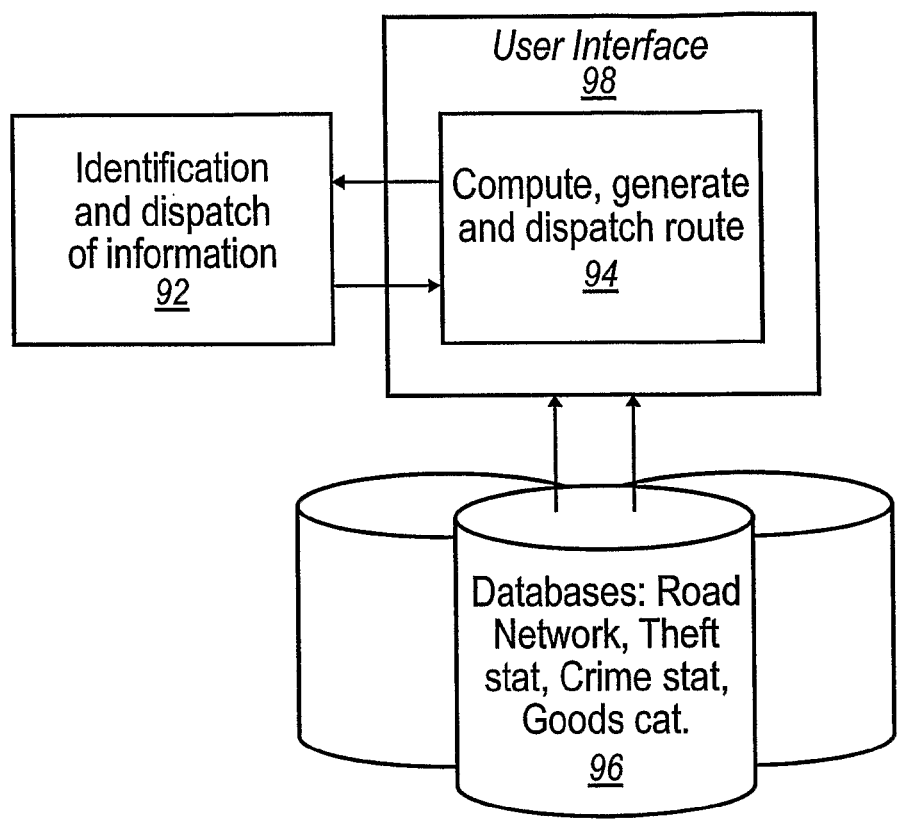
FIG. 7 is a schematic illustration of a navigation system according to the present invention; and, FIG. 8 is an illustration of a road map according to the present invention wherein an operator is only provided a portion of the route as the route is traversed.

Referring now to FIG. 7, a navigation system according to the invention can also be used as follows: items 58 are be loaded on a truck at a point of origin 84 for transport to a destination. The identity of the items are then determined and input 92, for example, according to a bill of lading, bar codes, RFID tags 60 associated with the item or by other means. Item information is then forwarded to a computer/processor 94 which can be a processor of the navigation device itself (52) or a processor of a remote computer 56. The information pertaining to the items can include type of item, quantity, origination map coordinates, destination map coordinates, time stamp, etc. Depending upon the specific configuration (local or remote control), the processor receives the detailed information and begins computation of a route. Exemplarily, the computer processor includes a CPU, a storage device, RAM memory and is capable of accessing various databases 96 necessary for the analysis.

The route determination program previously described is preferably installed in the computer/processor 94 and can communicate and interact with a user by means of a graphical interface 98 (display device/audible device). The databases 96 can include road networks, commercial/private vehicle theft statistics, other crime statistics, and goods categories theft statistics.

Figure 8:
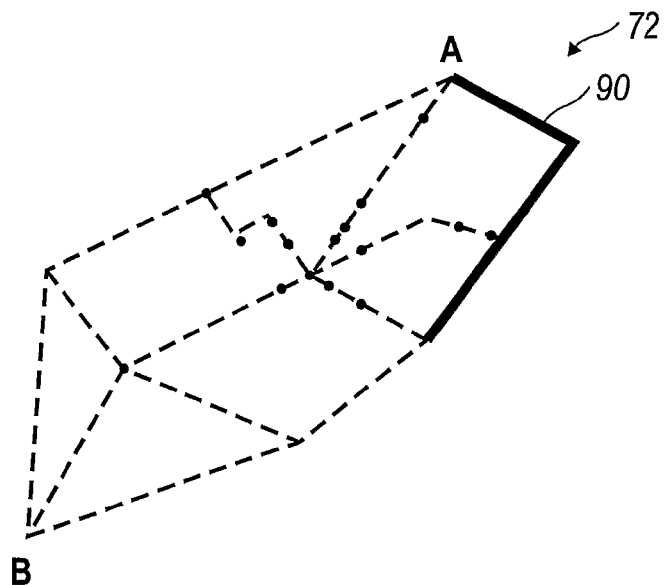

Once a computation is complete, the processor returns a secure route to be traversed and it is communicated by the navigation device in the form of route-guidance instructions. Depending upon the specific configuration of the navigation device/system, the route can be determined and communicated by a processor contained in the navigation device itself or communicated/calculated to the navigation device from a remote computer. Similarly, depending upon the specific configuration of the navigation device/system, an entire calculated route can be communicated to an operator at one time, or as shown in FIG. 8, a route portion 90 (shown as solid lines), can be communicated to an operator intermittently or upon reaching waypoints along a route to be traversed. Such intermittent communication of a route to be traversed can be used to avoid criminal activity that may result from internal espionage. In this manner, the entire route to be traversed can be kept secret from the operator until the final destination is reached.

The main advantage of the inventive system and method is that route planners can focus on vehicle, cargo and operator safety when planning transport routes. The algorithms can compute and illustrate the economical advantages of traversing safer, but longer routes as compared to shorter or faster routes computed by existing route planners. When compared with sensor-based solutions (face/iris/fingerprint scanning), the instant invention serves to prevent the initiation of criminal activity by serving to avoid areas of increased criminal activity or those areas where criminal activity is likely to be experienced. Indeed, existing "track & trace" systems, while certainly of assistance in augmenting the invention, simply do not assist in preventing the incidence of criminal activity.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Additionally, while the invention has been largely described in relation to the transport of cargo over land, the instant disclosure is exemplary and is not intended to so limit the invention.

What is claimed is:

1. A method for determining a trip route for travel comprising:
    obtaining start point data for a start point;
    obtaining end point data for an end point;
    obtaining crime risk data for at least one point along a possible trip route between the start point and the end point;
    determining a portion of a safe trip route between the start point and the endpoint based on the crime risk data;
    evaluating the portion of safe trip route by introducing at least one randomized variation to it;
    optimizing the portion of safe trip route considering item data regarding at least one item to be transported; and
    communicating the evaluated and optimized portion of the safe trip route via a navigation device.

2. The method of claim 1 wherein the start point data, the end point data and the crime risk data are transmitted to a computer.

3. The method of claim 2 wherein the computer is a remotely located computer.

4. The method of claim 3 wherein the remotely located computer determines the portion of the safe trip route and transmits data related thereto to the navigation device.

5. The method of claim 1 wherein the navigation device includes a visual communications device.

6. The method of claim 1 wherein the navigation device includes an audible communications device.

7. The method of claim 2 wherein the crime risk data is stored in a remotely located computer database.

8. The method of claim 2 wherein the crime risk data is transmitted from the navigation device to the computer.

9. The method of claim 2 wherein the determining the trip route further includes obtaining the item data regarding at least one item to be transported and communicating the item data to the computer.

10. The method of claim 9 wherein the item data is communicated by the at least one item.

11. The method of claim 2 wherein the entire safe trip route between the start point and the end point is calculated by the computer and a portion thereof is communicated via the navigation device.

12. A method for navigating along a trip route comprising:
    obtaining start point data, end point data and crime risk data and communicating the same to a computer;
    determining a portion of a safe trip route between the start point and the endpoint, the portion of the safe trip route calculated by the computer upon consideration of the crime risk data;
    evaluating the portion of safe trip route by introducing at least one randomized variation to it;
    optimizing the portion of safe trip route considering item data regarding at least one item to be transported;
    communicating a sub-portion of the evaluated and optimized safe trip route to a user via a navigation device:
    proceeding along the sub-portion of the evaluated and optimized safe trip route corresponding to a sub-portion communicated; and
    communicating a further sub-portion of the evaluated and optimized safe trio route to a user via the navigation device as the safe trip route is traversed.

13. The method of claim 12 wherein the computer comprises a remotely located computer, the remotely located computer in communication with the navigation device.

14. The method of claim 12 wherein the computer comprises a component of the navigation device.

15. The method of claim 12 wherein the crime risk data is stored in a central database.

16. The method of claim 12 wherein the crime risk data is transmitted from the navigation device to the computer.

17. The method of claim 12 wherein the determining the trip route further includes obtaining the item data regarding at least one item to be transported and communicating the item data to the computer and the portion of the safe trip route is calculated upon consideration of the item data.

18. The method of claim 17 wherein the item data is communicated by the at least one item.

19. The method of claim 12 wherein the entire safe trip route between the start point and the end point is calculated by the computer and a portion thereof is communicated via the navigation device.

20. A navigation system for navigating a safe trip route, the system comprising:
- a navigation device; and
- a computer;
- the navigation device indicating a geographical position thereof,
- the computer in communication with the navigation device,
- the computer determining a safe trip route upon consideration of at least a start point, an end point, and crime risk data for at least one point along a possible route between the start point and the endpoint,
- the computer evaluating the safe trip route by introducing at least one randomized variation to it and
- the computer optimizing the safe trip route upon consideration of item data pertaining to at least one item to be transported;
- the navigation device communicating at least a portion of the evaluated and optimized safe trip route as the navigation device traverses the safe trip route.

21. The system of claim 20 wherein the item data is communicated to the computer by the item.

22. The system of claim 20 wherein the computer comprises a remotely located computer.

23. The system of claim 20 wherein the computer comprises a component of the navigation device.

24. The system of claim 20 wherein the navigation device comprises a transceiver.

25. The system of claim 20 wherein the navigation device communicates with a GPS network.

26. The system of claim 20 wherein the navigation device communicates with a non-GPS radio network.

27. The system of claim 20 further comprising determining the safe trip route upon consideration of an operator of a vehicle selected to transport the item.

* * * * *